Nov. 29, 1966 — G. G. KLINGER ETAL — 3,288,547

SPECTACLE MOUNTING FOR FULL FACE MASK

Filed April 13, 1964

INVENTORS
GUY G. KLINGER
GEORGE R. HOFFMASTER
BY
his ATTORNEY

United States Patent Office 3,288,547
Patented Nov. 29, 1966

3,288,547
SPECTACLE MOUNTING FOR FULL FACE MASK
Guy G. Klinger, Shillington, and George R. Hoffmaster, Reading, Pa., assignors to The Electric Storage Battery Company, Philadelphia, Pa.
Filed Apr. 13, 1964, Ser. No. 359,284
2 Claims. (Cl. 351—155)

This invention relates to an adjustable spectacle mounting in a full face mask, such as a gas mask, underwater mask, airline respirator mask and the like, and, more particularly, relates to means for adjustably mounting the temples of prescription glasses totally within the confines of the air-tight seal between the mask and head of the wearer. This application is an improvement over the construction shown in U.S. Patent 3,182,658 dated May 11, 1965.

An outstanding disadvantage of conventionally used mountings for spectacles worn with gas masks and the like is that, in many constructions, the temples extend through and break the seal which exists between the periphery or margin of the gas mask and the wearer's head, therefore subjecting the wearer to the danger of noxious gas which will enter the mask through the broken seal. There are some types of spectacle mountings which are wholly enclosed in the mask, however, these have the outstanding disadvantage of being relatively complicated in construction, particularly in the means for adjusting the distance between the lens frame and the eyes of the wearer.

An object of the present invention is to provide an adjustable mounting for prescription glasses or spectacles worn inside a full face mask and which will overcome the above named disadvantages so as to provide a temple mounting which will have no deleterious effect on the seal between the mask and the wearer's head and which mounting or construction is relatively simple and inexpensive.

A more specific object of the invention is to provide prescription glasses with temples having only a fractional dimension of the usual length and to pivot the ends of such temples to the existing pivotal joint between the gas mask and headgear so as to prevent the necessity of further perforation or modification of the construction of a conventional gas mask.

Other objects and advantages of the invention will become more apparent from a study of the following description taken with the accompanying drawing wherein.

Figure 1:
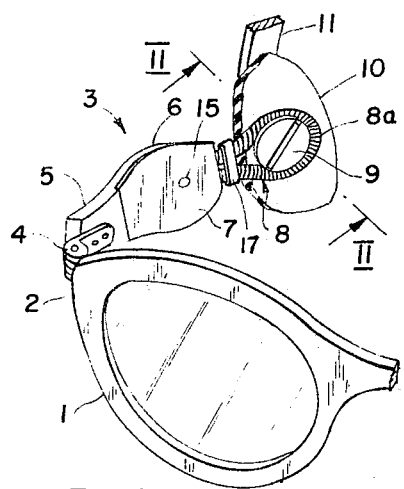
FIG. 1 is a perspective, fragmentary view of a gas mask equipped with a temple embodying the principles of the present invention.

Referring more particularly to FIG. 1 of the drawing, numeral 1 denotes a fragmentary portion of the rim of a pair of prescription glasses provided with temple pivot brackets 2, 4 pivotally interconnected. Bracket 4, in turn, is fastened to a stubby temple 5 of approximately half the length of a normal temple. The rear portion 6 of temple 5 is cut away in thickness and is grooved at 13, as shown more clearly in FIG. 3, and finally covered by a cover 7 which is fastened to temple 5 by a bolt, rivet or stud 15.

An endless, helical spring 8, such as a garter spring, is entrained or looped through grooved portion 13, formed in the temple portion 6, so as to surround a pulley-like portion 14 integrally secured to temple portion 6. Temple 5, portion 14 and cover 7 may all be of transparent, plastic material. Spring 8 may be made endless by taking a length of spring and connecting the ends thereof together at 16. After the cover 7 is secured in place a loop 17, preferably of plastic material, is slipped over portion 8a and thereafter portion 8a is stretched and slipped over temple pivot screw 9 (see FIG. 1) which projects through portion 10 of a gas mask of well known construction provided with an air-tight lens (not shown) which confronts the rims 1, as shown by earlier applications.

By virtue of the above construction, the eyeglasses 1 are automatically adjusted as to temple length by the stretching of spring 8 as a consequence of pushing of the nosepiece by the nose of the wearer. Moreover, since pivot screw 9 is connected to temple 5 only by spring 8, a universal connection is provided to automatically adjust the eyeglasses to the face of the wearer and to gas mask 10.

Figure 2:
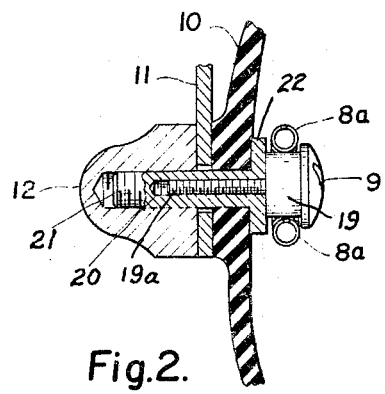
FIG. 2 is a cross-sectional view taken along line II—II of FIG. 1.
Figure 3:
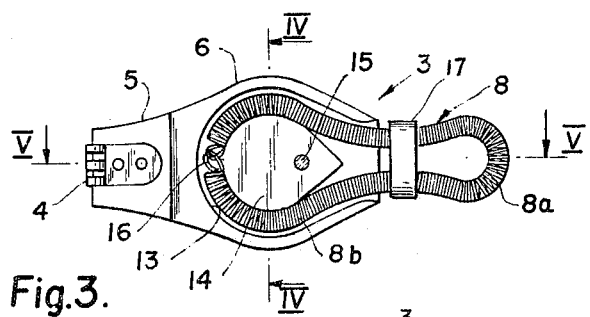
FIG. 3 is a somewhat enlarged, plan or inside view of the temple shown in FIG. 1, with the cover 7 removed to more clearly show the internal parts.
Figure 4:
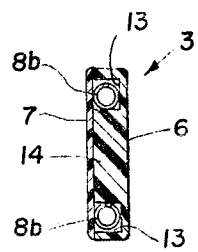
FIG. 4 is a cross-sectional view taken along line IV—IV of FIG. 3.
Figure 5:
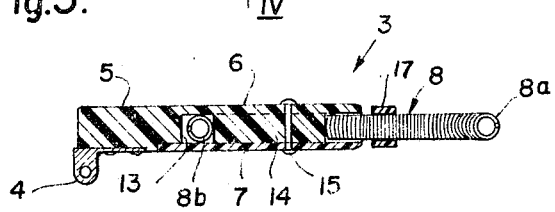
FIG. 5 is a cross-sectional view taken along line V—V of FIG. 3.

As shown in FIGS. 2 and 3, the common pivotal joint for the temple portions 5 and headgear 11 may be made up of a temple pivot screw 9 having an integral collar 19 and a threaded shank 19a, which shank is screw threaded to an interiorly threaded portion 20 of a threaded shank 21 which is integral with an annular head portion 22. The internally threaded cap screw 12, upon being turned clockwise, will draw in head portion 22 as well as pivot screw 9 so as to clamp the various parts in tight frictional engagement to prevent relative pivotal movement therebetween. Of course, when it is desired to permit pivotal movement of the headgear 11 relative to the mask, cap screws 12 are unscrewed slightly. Similarly, when freer pivotal movement of temples 5 is desired, pivot screw 9 is unscrewed slightly to prevent clamping of the temple between it and head portion 22. It should be noted that screws 9 and 22 may be, instead, in the form of rivets, eyelets, studs or snap fasteners as described in my aforesaid earlier application.

Thus, the temple assembly, denoted generally by numeral 3, by virtue of its connection by spring 8 to pivot screw 9 will automatically accommodate wearers having widely different ophthalmic requirements, head sizes and nose sizes.

Therefore, it will be seen that we have provided an efficient mounting for pivotally mounting temples of prescription glasses inside a gas mask and arranged so as not to project through the sealing surfaces between the marginal portion of the gas mask and the face or head of the wearer and thus break such seal; furthermore, we have provided a relatively simple adjusting means for obtaining selective lengths of the temple and pivotal movement thereof to accommodate wearers having widely different head sizes and nose sizes.

While we have illustrated and described a single embodiment of our invention, it will be understood that this is by way of illustration only, and that various changes and modifications may be made within the contemplation of our invention and within the scope of the following claims.

We claim:

1. In combination with a full face piece mask having a headgear which is joined to the side portions of said face piece by pivotal mountings confronting the temple portions of the wearer's head, in combination, a pair of eyeglasses having temples of a fraction of normal length, each temple having a rear portion of reduced thickness provided with a substantially circular groove surrounding a pulley-like, central portion which is integral with the temple, and a cover portion covering said central portion and groove, an endless helical spring having a portion in said groove, each of said pivotal mountings having a collar portion and an enlarged head which is spaced inwardly from the inner surface of said mask, the remainder of the helical spring projecting outwardly of the rear end of said temple and being looped about the collar portion of said pivotal mounting, said springs constituting the sole and universal connections between said temples and pivotal mountings.

2. The combination recited in claim 1 together with a loop element snugly surrounding the intermediate portion of each spring between each temple and pivotal mounting to provide close circling engagement of the spring with said collar portion.

References Cited by the Examiner
UNITED STATES PATENTS

| | | | |
|---|---|---|---|
| 1,170,462 | 2/1916 | Schroeder | 2—10 |
| 2,301,050 | 11/1942 | Kelley | 2—10 |
| 2,903,700 | 9/1959 | Finken et al. | 2—10 |
| 2,962,722 | 12/1960 | Curran | 351—155 X |
| 3,182,658 | 5/1965 | Klinger | 351—155 X |

DAVID H. RUBIN, *Primary Examiner.*